(12) United States Patent
Markhasin et al.

(10) Patent No.: US 12,072,962 B2
(45) Date of Patent: Aug. 27, 2024

(54) METHOD, COMPUTER PROGRAM AND SYSTEM FOR AUTHENTICATING A USER AND RESPECTIVE METHODS AND SYSTEMS FOR SETTING UP AN AUTHENTICATION

(71) Applicant: Sony Semiconductor Solutions Corporation, Kanagawa (JP)

(72) Inventors: Lev Markhasin, Kanagawa (JP); Bi Wang, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 498 days.

(21) Appl. No.: 17/327,770

(22) Filed: May 24, 2021

(65) Prior Publication Data
US 2021/0374221 A1   Dec. 2, 2021

(30) Foreign Application Priority Data
May 26, 2020 (EP) .................................. 20176434

(51) Int. Cl.
*G06F 21/32* (2013.01)
*G06F 3/01* (2006.01)
(Continued)

(52) U.S. Cl.
CPC .............. *G06F 21/32* (2013.01); *G06F 3/017* (2013.01); *G06N 3/08* (2013.01); *G06V 40/107* (2022.01);
(Continued)

(58) Field of Classification Search
CPC . H04L 63/1425; H04L 63/1416; H04L 67/10; H04L 9/3231; H04L 9/32; H04N 21/21815; H04N 21/2407; H04N 21/6332; H04N 21/8133; H04N 21/858; G06F 16/9574; G06F 21/6245; G06F 21/6227; G06F 21/84; G06F 9/451; G06F 21/32; G06F 3/017; G06F 2221/2141;
(Continued)

(56) References Cited

U.S. PATENT DOCUMENTS

| 8,970,348 B1 | 3/2015 | Evans et al. |
| 2008/0100572 A1 | 5/2008 | Boillot |

(Continued)

OTHER PUBLICATIONS

Kun Yu et al., "The Study of Facial Gesture Based on Facial Features," Aug. 24-27, 2018, pp. 105-109 (Year: 2018).*
Kam Lai et al., Towards Gesture-Based User Authentication,: 2012, pp. 282-287. (Year: 2012).*
Choi et al., "A Multimodal User Authentication System Using Faces and Gestures", Hindawi Publishing Corporation BioMed Research International, vol. 2015, Article ID 343475, 8 pages.

*Primary Examiner* — Luu T Pham
*Assistant Examiner* — Canh Le
(74) *Attorney, Agent, or Firm* — XSENSUS LLP (57) ABSTRACT

The present disclosure relates to a method for authenticating a user. The method comprises recording image data of the user and deriving at least one first facial feature of the user's face and at least one first gesture feature of one or more gestures of the user from the image data. The method further provides for determining a degree of access of the user to data depending on whether the first gesture feature corresponds to at least one predetermined second gesture feature and whether the first facial feature corresponds to at least one predetermined second facial feature.

17 Claims, 5 Drawing Sheets

(51) Int. Cl.
*G06N 3/08* (2023.01)
*G06V 40/10* (2022.01)
*G06V 40/16* (2022.01)
*G06V 40/20* (2022.01)
*G06V 40/70* (2022.01)

(52) U.S. Cl.
CPC .......... *G06V 40/168* (2022.01); *G06V 40/172* (2022.01); *G06V 40/28* (2022.01); *G06V 40/70* (2022.01); *G06F 2221/2141* (2013.01)

(58) Field of Classification Search
CPC ............ G06F 2221/2133; G06F 21/31; G06Q 30/0255; G06Q 30/0261; G06Q 50/10; G06N 3/08; G06V 40/107; G06V 40/168; G06V 40/172; G06V 40/28; G06V 40/70; G06V 40/16; G06V 40/20
See application file for complete search history.

(56) References Cited

U.S. PATENT DOCUMENTS

| | | | |
|---|---|---|---|
| 2011/0164792 A1* | 7/2011 | Yoon | G06V 20/653 |
| | | | 382/118 |
| 2014/0310764 A1 | 10/2014 | Tippett et al. | |
| 2016/0048726 A1* | 2/2016 | Tang | H04N 13/207 |
| | | | 382/103 |
| 2017/0160797 A1* | 6/2017 | Mora | G06F 3/017 |
| 2018/0364810 A1 | 12/2018 | Parshionikar | |
| 2019/0166119 A1* | 5/2019 | Hecker | G06V 40/70 |
| 2020/0238952 A1* | 7/2020 | Lindsay | G06V 30/194 |
| 2020/0272717 A1* | 8/2020 | Figueredo de Santana | |
| | | | G06V 40/172 |
| 2020/0394322 A1* | 12/2020 | Ramos | G06F 16/93 |

* cited by examiner

METHOD, COMPUTER PROGRAM AND SYSTEM FOR AUTHENTICATING A USER AND RESPECTIVE METHODS AND SYSTEMS FOR SETTING UP AN AUTHENTICATION

CROSS-REFERENCE TO RELATED APPLICATION

The present application claims priority to European Patent Application No. 20176434.7 filed by the European Patent Office on May 26, 2020, the entire contents of which being incorporated herein by reference.

FIELD

Embodiments of the present disclosure relate to method, a computer program and a system for authenticating a user and respective methods and systems for setting up an authentication.

BACKGROUND

Usually, people have trouble remembering a secure password for authentication purposes. Biometry based or gesture based authentication concepts, instead, have other downsides. For example, biometric features cannot be shared, while gesture based authentication concepts may merely provide a weak protection.

Therefore, preferably a combination of gesture based and biometric authentication concepts is used. In some applications thereof, it may be requested that different users have different access rights to data protected by the said authentication concept.

Hence, there is a demand for an improved authentication concept for granting different users different access rights to data.

SUMMARY

According to one aspect, the present disclosure relates to a method for authenticating a user. The method comprises recording image data of the user and deriving at least one first facial feature of the user's face and at least one first gesture feature of one or more gestures of the user from the image data. The method further provides for determining a degree of access of the user to data depending on whether the first gesture feature corresponds to at least one predetermined second gesture feature and whether the first facial feature corresponds to at least one predetermined second facial feature.

The image data can be recorded using a lidar system, a radar system, a Time-Of-Flight (TOF) camera, a (RGB, thermal, and/or stereo) photo camera, and/or a video camera. Accordingly, the image data comprises a single picture or a sequence of pictures (e.g. a video) of the user.

The image data particularly contains recordings of the user's face to reflect one or more first facial features such as a distinct shape, size and/or position of the user's eyebrows, eyes, mouth, face, nose, wrinkles and/or cheeks. Optionally, the first facial features merely may indicate whether the image data reflect a human face. For example, a comparison of temperature values of the image data from the thermal camera with the usual human body temperature verifies whether the image data reflect a human face. The image data of the user's face additionally can reflect a facial expression of the user which can be used as a gesture of the user.

Additionally, the image data can include recordings of the user's body to reflect gestures which the user does with one or more of his body parts, i.e. arms, legs, shoulders, fingers and/or head. Accordingly, the aforementioned first gesture, for example, comprises at least one of a facial expression, a gesture of the user's body, and/or a combination thereof. Thus, a first gesture can comprise a wink, a smile, an eyebrow raise, and/or a sign and/or, a motion of the user's (left or right) hand or one or more fingers.

The first facial feature and the first gesture can be derived from the image data using a computer program or an appropriately trained artificial neural network (ANN) for gesture and face recognition.

The second gesture feature and the second facial feature can be either preset by a verified user or legal owner of the data or automatically by a computer program and can be understood as a condition for the first facial feature and the first gesture feature. The second gesture feature, for example, defines a predefined motion to be done with the user's finger to correspond to the second gesture feature. The second facial feature, for example, is a generic human facial feature (e.g. eyes, nose and mouth). Alternatively, the second facial feature corresponds to a unique/biometric facial feature of the owner or verified user.

Depending on whether none, one or both of the first gesture feature and the first facial feature correspond to the second gesture feature and the second facial feature, respectively, the user may be granted a different degree of access to data protected by the authentication.

Different degrees of access enable the user to access different portions of the data and/or different capabilities of the user to handle the data. For example, the degree of access enables the user to merely read a first portion of the data, to read and modify a second portion of the data, and disallows the user to read or modify a third portion of the data.

In this way, different users can be granted different degrees of access. For example, a user merely knowing the predetermined second gesture feature can get a different degree of access than another user who knows the second gesture feature and whose face has the preset second facial feature.

The second gesture feature can be shared with multiple users. Hence, the above method, for example, enables multiple users to read the data but only one verified user having the second facial feature to modify the data.

As experience has shown, gestures are remembered easier than passwords or passphrases. Therefore, sharing data among multiple users using the above method can be easier than sharing password-protected data.

According to another aspect, the present disclosure relates to a computer program comprising instructions, which, when the computer program is executed by a processor, cause the processor to carry out the aforementioned method.

The processor, for example, is a programmable hardware, a microcontroller, a central processing unit (CPU), a graphics processing unit (GPU), a field programmable gate array (FPGA) or comparable devices for data processing.

According to another aspect, the present disclosure relates to a system for authenticating a user. The system comprises a camera configured to record image data of the user and a data processing circuitry configured to derive at least one first facial feature of the user's face and at least one first gesture feature of one or more gestures of the user using the image data. The data processing circuitry is further configured to determine a degree of access of the user to data depending on whether the first gesture feature corresponds to at least one predetermined second gesture feature and whether the first facial feature correspond to at least one predetermined second facial feature.

The above system may particularly be eligible for executing the above method. Therefore, features mentioned in connection with the above method can therefore be applied to the system by analogy.

According to another aspect, the present disclosure relates to a method for setting up an authentication of a first user based on at least one sensed first facial feature of the first user's face and at least one sensed first gesture feature of one or more gestures of the first user. This method comprises recording reference image data of a second user and deriving at least one of a second gesture feature of one or more gestures of the second user and a second facial feature of the second user's face using the reference image data for determining a degree of access of the first user to data depending on whether the first gesture feature corresponds to the second gesture feature and whether the first facial feature correspond to the predetermined second facial feature.

The second user can be an owner of data to be shared with the first user or multiple other users. For this, the second user can predefine the second gesture feature and the second facial feature through the reference image data reflecting one or more distinct gestures of the second user and the second user's face.

Additionally, the method for setting up the authentication of a first user can provide for presetting different degrees of access of the first user in cases where whether none, one, or both of the first gesture feature and first facial feature corresponds to the second gesture feature and the second facial feature, respectively. For this, the second user, for example, specifies the degrees of access for the said cases. In this way, the second user, for example, enables multiple users knowing the predetermined second gesture feature to read the data, whereas only the second user can read and modify the data as the second facial feature is a unique biometric feature of the second user.

According to another aspect, the present disclosure relates to a computer program comprising instructions, which, when the computer program is executed by a processor, cause the processor to carry out the aforementioned method for setting up an authentication.

According to another aspect, the present disclosure relates to a system for setting up an authentication of a first user based on at least one sensed first facial feature of a face of the first user and at least one sensed first gesture feature of one or more gestures of the first user. The system comprises a camera configured to record reference image data of a second user and a data processing circuitry. The data processing circuitry is configured to derive at least one of a second gesture feature of one or more gestures of the second user and a second facial feature of a face of the second user using the reference image data for determining a degree of access of the first user to data depending on whether the first gesture feature corresponds to the second gesture feature and whether the first facial feature correspond to the predetermined second facial feature.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1:
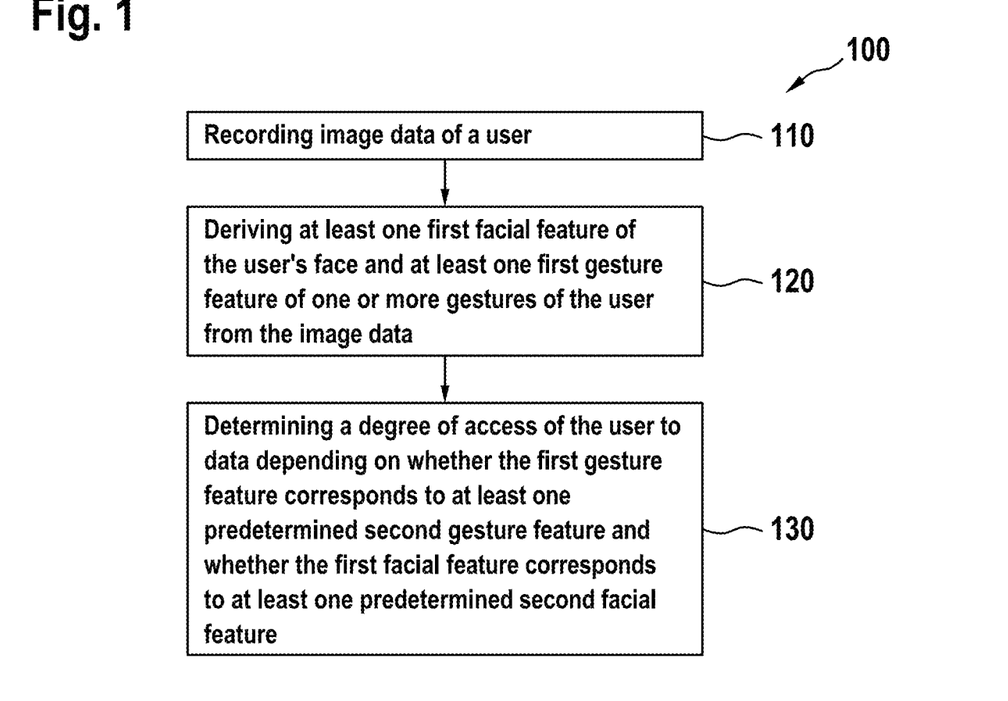
FIG. 1 shows a flowchart schematically illustrating a method for authenticating a user.

FIG. 1 schematically illustrates a method 100 for authenticating a user. The method comprises recording 100 image data of the user and deriving 120 at least one first facial feature of the user's face and at least one first gesture feature of one or more gestures of the user from the image data. The method 100 further provides for determining 130 a degree of access of the user to data depending on whether the first gesture feature corresponds to at least one predetermined second gesture feature and whether the first facial feature corresponds to at least one predetermined second facial feature.

It should be noted that, even if only one first user is mentioned here, method 100 can be applied for authenticating several (first) users. Method 100 can also be performed several times on the user to repeat or confirm an authentication of the user.

Particularly, method 100 can be applied to grant different users different degrees of access. The degrees of access can be also referred to as "access rights".

For example, if the first gesture feature corresponds to the second gesture feature, the degree of access enables the user to retrieve the data. Otherwise, if the first gesture feature corresponds to the second gesture feature and the first facial feature correspond to the predetermined second facial feature, the degree of access may enable the user to retrieve (read) and modify (write) the data.

In general, the degree of access can enable the user to retrieve and modify the data if either the first gesture feature or the first facial feature corresponds to the second gesture feature and the second facial feature, respectively.

Method 100 can be applied for protection of mobiles, laptops, personal assistant devices, gaming consoles, documents or data (e.g. stored in a cloud storage).

The second gesture feature and the second facial feature are predefined, for example, by a (legal) owner of data to be protected through the aforementioned authentication. To this end, the owner can use method 200 shown in FIG. 2 for setting up an authentication of a first user based on at least one sensed first facial feature of the first user's face and at least one sensed first gesture feature of one or more gestures of the first user. In context of the present disclosure, the above "authentication" particularly can be understood as "means for authentication".

Figure 2:
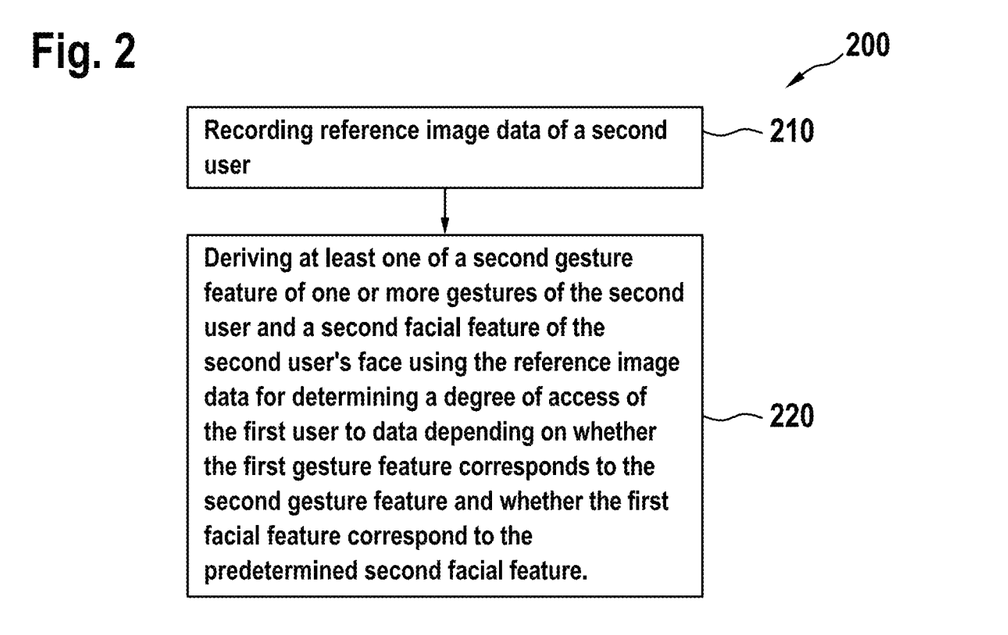
FIG. 2 shows a flowchart schematically illustrating a method setting up an authentication of a user.

Method 200 comprises recording 210 reference image data of a second user and deriving 220 at least one of a second gesture feature of one or more gestures of the second user and a second facial feature of the second user's face using the reference image data for determining a degree of access of the first user to data depending on whether the first gesture feature corresponds to the second gesture feature and whether the first facial feature corresponds to the predetermined second facial feature.

The second user can be the aforementioned owner or a publisher who wants to share the data with the first user. The first user, for example, is a person to be authenticated. It should be noted that, even if only one first user is mentioned here, the method 200 can be used to set up the authentication for several (first) users.

Figure 3:
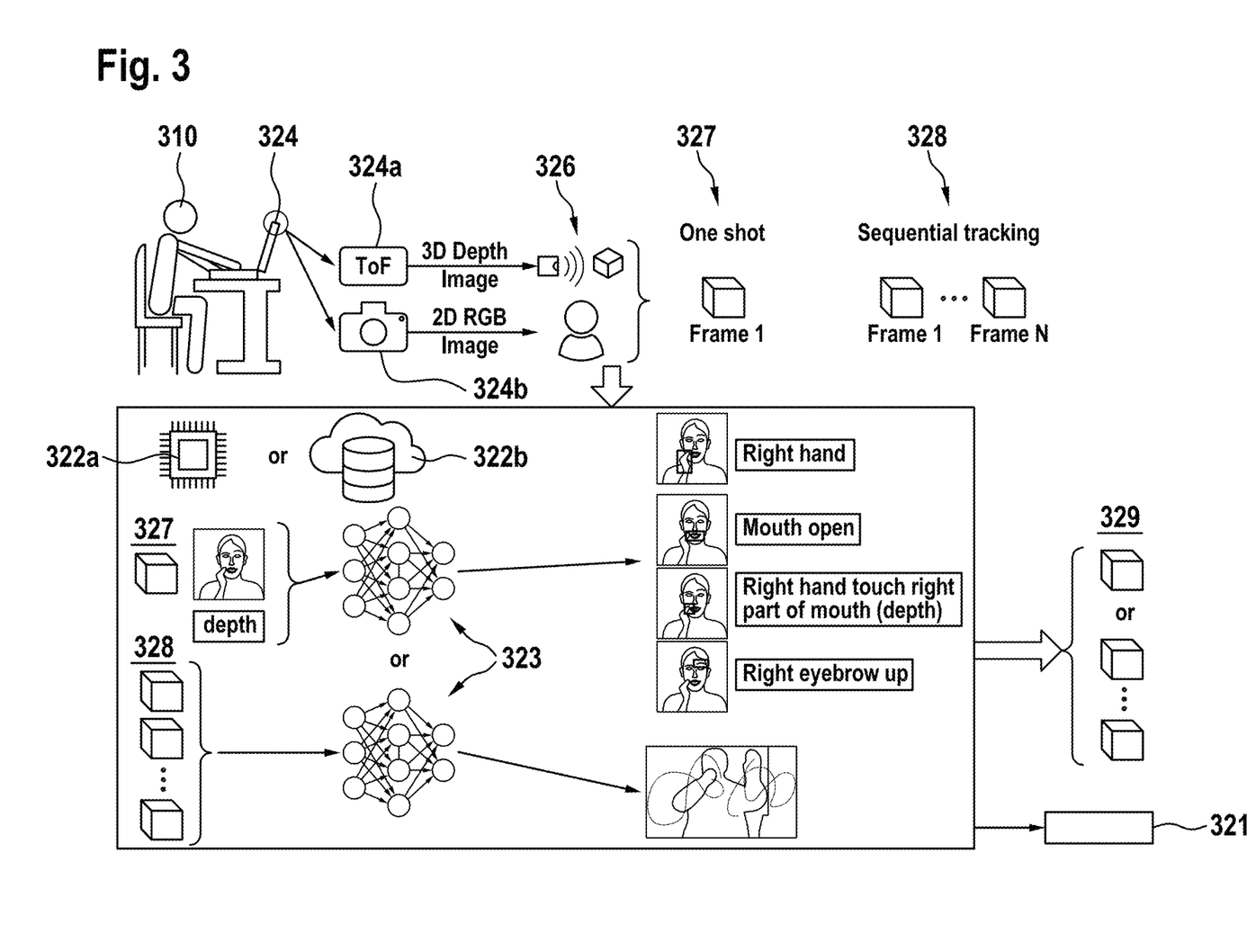
FIG. 3 illustrates an application of the method for setting up the authentication of a user.

FIG. 3 illustrates an application of method 200 in a system comprising a camera system 324 having a Time-Of-Flight (TOF) camera 324 a and a color-sensitive camera 324b, also referred to as "RGB camera", for recording the reference image data of an (data) owner 310 of data who can be construed as the second user in method 200. Hence, the reference image data 326 comprises three-dimensional (3D) reference image data from the TOF camera 324 a and two-dimensional (2D) reference image data from the RGB camera 324b. The 2D reference image data can have a resolution of 150×150 pixels. The 3D reference image data, for example, comprise a 3D depth image also referred to as "point cloud" reflecting measurement points of the data owner 310 in three dimensions. The reference image data 326 can comprise a single reference shot/image 327 or a sequence of reference images 328.

The owner 310, for example, starts the recording of the reference image data by pressing a button. Subsequently, the reference image data 326 can be recorded in a specific timeframe after pressing the button.

In a subsequent processing of the reference image data 326, the single reference image 327 and/or the sequence of reference images 328 are processed in an artificial neural network (ANN) 323 to extract (predetermined) gesture features 329. To this end, the ANN 323 can run an object recognition framework like, for example, deeply supervised object detectors (DSOD), a TinyDSOD, training single-shot object detectors from scratch (ScratchDet), single shot detectors (SSD), or you only look once (YOLO). The processing can be carried out on a data processing circuitry like, for example a processor (e.g. a private computer) 322a, a cloud computing system 322b or the like.

The above object recognition frameworks can be trained in advance using machine learning (e.g. supervised or unsupervised machine learning) based on training image data of test users. Hence, some embodiments of method 100 using machine learning based object recognition frameworks comprise recording training image data of test users. Experience shows that the training image data preferably have the same resolution as the reference image data, i.e. 150×150 pixels.

In practice, the training image data can contain more than 10,000 images of several test users in "realistic" circumstances (e.g. lighting conditions) and dimensions.

In some applications using machine learning based object recognition frameworks, method 100 further comprises determining labels indicative of one or more gestures reflected by the training image data. The labels can be determined manually or (semi-) automatically and, for example, comprise one or more gesture features like: "left eye open", "left eye closed", "right eye open", "right eye closed", "mouth open", "mouth closed", "mouth smiles", "nose holes open", "head vertical", "head tilted 45°", "right hand shows victory sign", "left hand shows thumbs-up sign".

The labels can be further indicative of bounding boxes (e.g. their center position and extent) of the gestures in the training image data.

The training image data and the labels may be used for training one of the above object recognition frameworks.

In addition, the ANN 323 can run deep learning-based frameworks like "BioMetricNet", "FaceNet", "ArcFace", and/or "CoseFace" for extracting the facial features 321 of the owner's face from the image data 326.

As can be seen from FIG. 3, the static predetermined gesture features 329 can be indicative of different 2D or 3D signs or motions of the owner 310. The predetermined gesture features 329, for example, are indicative of signs or motions of the owner's body parts (e.g. head, shoulders, arms, hands, fingers, head, face, eyes, legs, etc.)

In addition, the ANN 323 can extract facial features 321 of the owner's face from the reference image data 326. The facial features 321 can be biometric features of the owner's face.

The predetermined gesture features 329 and the predetermined facial features 321 can be understood as the second gesture features and the second facial features, respectively, in applications of method 100.

Figure 4:
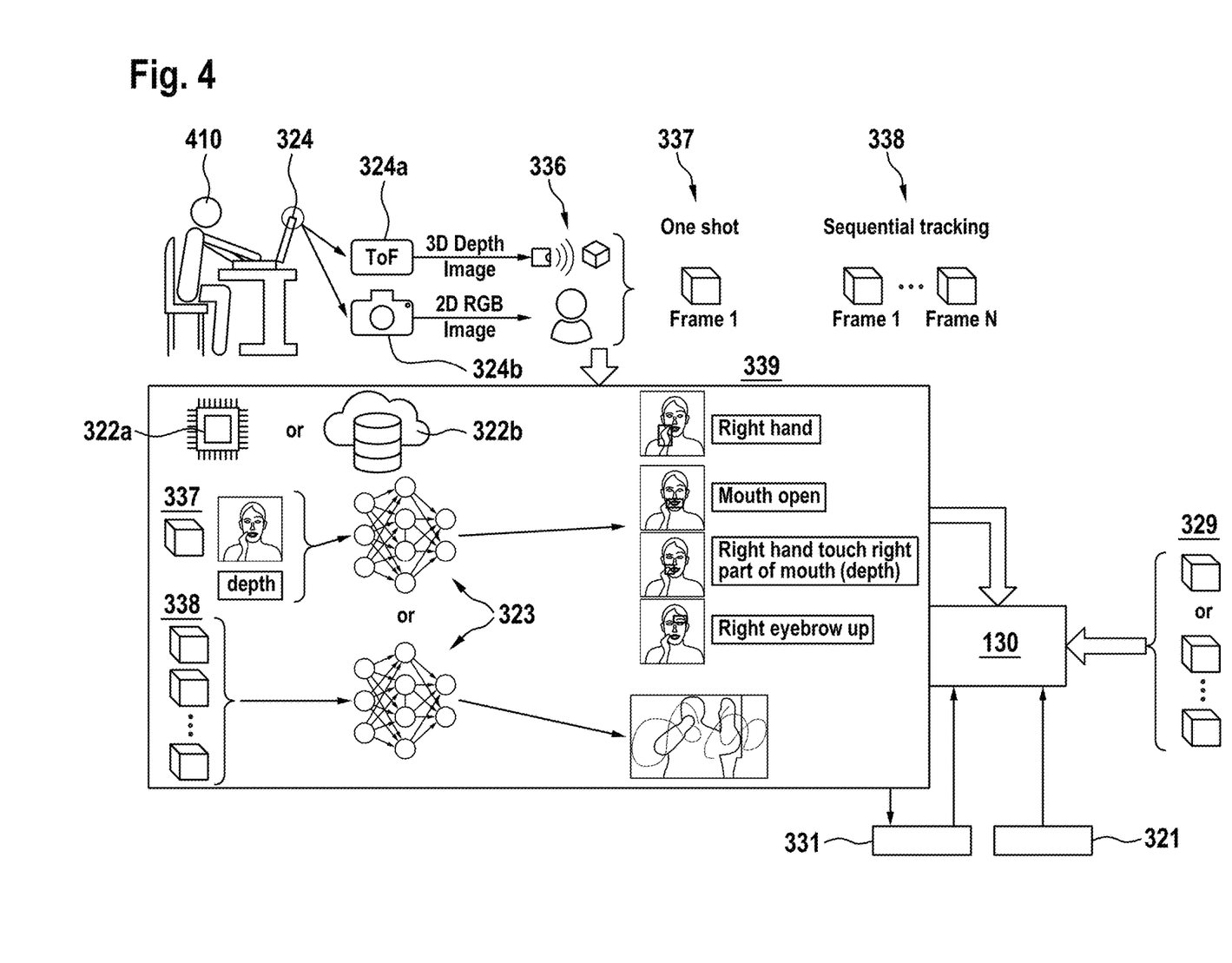
FIG. 4 illustrates an application of the method for authenticating a user.

FIG. 4 illustrates an application of method 100 in a system for authenticating a user 410. User 410, for example, exemplarily represents the first user of method 200. The system for authenticating the user 410, for example, is the same as used for setting up the authentication according to method 200. In general, various systems can be used for setting up the authentication and for authenticating the user 410.

The recording of (reference) image data 326 and 336, respectively, optionally is controlled by gestures of owner 310 and user 410.

The user 410, for example, triggers the camera system 324 to record image data 336 by pressing a button and performs one or more gestures and/or facial expressions to be recorded by the camera system 324.

In practice, the user 410, for example, has been told the predetermined gesture features 329 by the owner 310 to grant the user 410 access to the data protected through the authentication. In this case, user 410 can imitate those predetermined gesture features 329.

The image data 336 can comprise a single image 337 and/or a sequence of images 338 (e.g. a video). The image data 336, for example, comprises 3D image data from the TOF camera 324 *a* and/or 2D image data from the RGB camera 324*b*.

The image data 336 can be processed by the ANN 323 to extract gesture features 339 of the user's gestures and facial features 331 of the user's face from the image data 336.

As can be seen from FIG. 4, the gesture features 339 can be indicative of different (static) signs made by the user 410. Optionally, the gesture features 339 are indicative of 2D or 3D motions of the user 410.

In addition, the ANN 323 can extract facial features 331 of the user's face from the image data 336.

In further data processing, the gesture features 339, as well as the facial features 331 are compared to the predetermined gesture features 329 and the predetermined facial features 321 for determining 130 the degree of access of the user 410 to the data. The degree of access can be predefined by the owner 310 in another step of method 200 and, for example, depends on whether the gesture features 339 corresponds to the predetermined second gesture features 329 and whether the facial features 331 corresponds to the predetermined second facial features 321. In other words, the degree of access depends on whether gestures, face or both are authenticated.

In practice, three different scenarios are conceivable:
1. If user 410 is the owner 310, gestures and face are authenticated. As a result, the degree of access allows/user 410 to retrieve (read) and modify (write) the data. Hence, user 410 can add or delete data.
2. If user 410 is not the owner 310, face cannot be authenticated but the gestures may be authenticated if user 410 imitated the predetermined gesture features 329. As a result, user 410 can retrieve the data but cannot modify/change any of the data according to the degree of access.
3. Face is authenticated but gestures are not authenticated which indicates that either the authentication of the user's face failed due to a technical problem or user 410 is an intruder, for example, using a printed photo to get access to the data. Hence, the degree of access allows no access, neither to read nor to write.

The degree of access may alternatively or additionally specify a period of time during which user 410 can access the data.

Figure 5A:
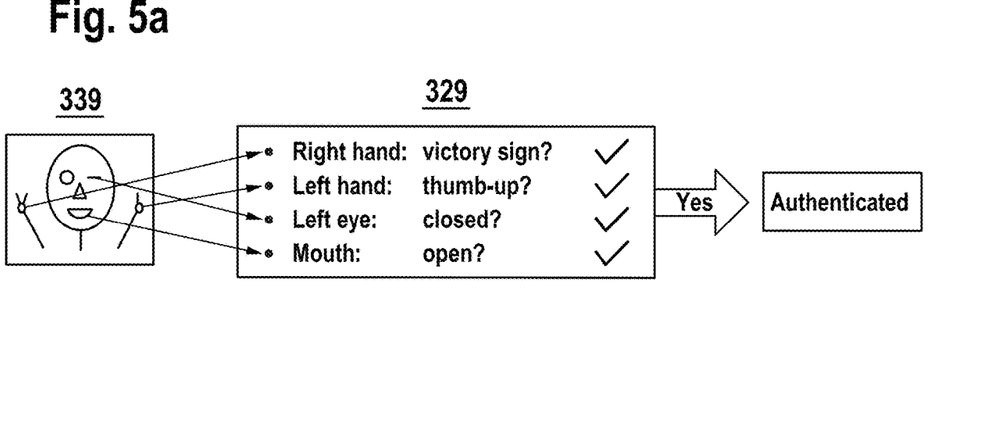
FIG. 5a schematically illustrates a first scenario of gesture-based authentication.
Figure 5B:
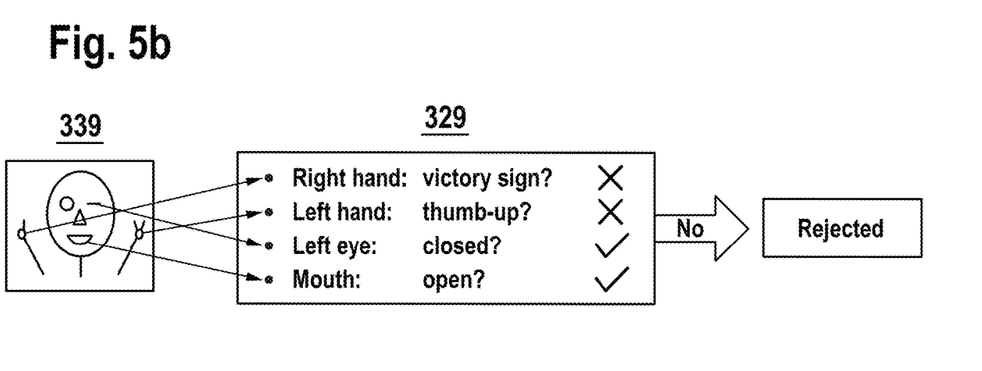
FIG. 5b schematically illustrates a second scenario of gesture-based authentication.
Figure 5C:
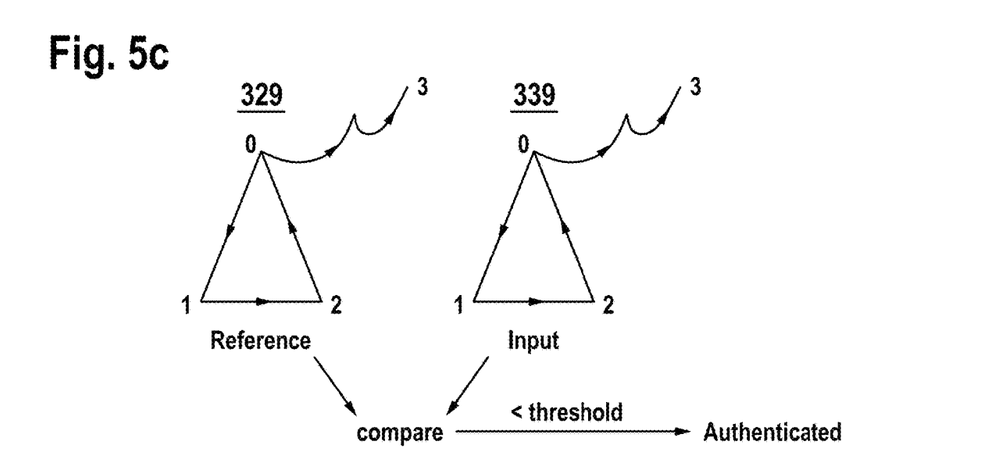
FIG. 5c schematically illustrates a third scenario of gesture-based authentication.

FIG. 5*a*, 5*b*, 5*c* illustrate different examples of gesture-based authentication.

In the scenario of FIG. 5*a* the user 410 imitates the predetermined gesture features 329 correctly. As a result, the predetermined gesture features 329 and the gesture features 339 of the user's gestures are indicative of same gestures (i.e. "right hand shows victory sign", "left hand shows thumbs-up sign", "left eye is closed", "mouth is open"). Therefore, the gestures of user 410 are authenticated.

In the scenario of FIG. 5*b*, user 410 mixes up hands, such that the predetermined gesture features 329 and the gesture features 339 differ. As a result, the gestures of user 410 are not authenticated, i.e. user 410 gets rejected.

In some applications of method 100, the degree of access may depend particularly on a measure of correspondence between the gesture features 339 and the predetermined features 329. For example, the degree of access depends on how many of the gesture features 339 match the predetermined features 329. This, for example, allows the owner 310 to grant different users different degrees of access by sharing a respective portion of the predetermined gesture features 329.

In further applications, the authentication considers hand positions relative to each other and to the user's or owner's face: e.g. both hands left from face, right hand over the left hand. Further optionally, the authentication can consider an angle of the user's or owner's head: e.g. head being tilted 30 or 60 degree to either side, backwards or slightly rotated. In such applications, the gesture features 329 and 339 are indicative of an execution of the gestures (e.g. hand positions, head pose, etc.).

A level of detail of the gesture features 329 and 339 may particularly depend on a spatial resolution of the image data 326 and 336. Depending on the resolution whether The aforementioned authentication can be seen as a game by users and can be memorized more easily than text passwords. An advantage of the above authentication may be that also children can memorize and imitate the predetermined gesture features 329. Further, the predetermined gesture features 329 can be shared with users to be granted access to the data.

As can be seen from FIG. 5*c*, the gesture features 329 and 339 alternatively or additionally can comprise a motion pattern. The motion pattern, for example, is a movement curve of the owner's and the user's finger, respectively. Alternatively, it can be that of any other body part.

For example, hand/finger sequential tracking is used to determine the motion pattern from the image data 336. The motion pattern particularly can be a 2D or 3D curve in space. Alternatively, multiple motion patterns can be used for the authentication. For example, the predetermined gesture features 329 comprise curves of multiple fingers or hands.

In the scenario of FIG. 5*c*, the gesture-based authentication is successful if the motion pattern, i.e. the curve, of the gesture features 329 and 339 correspond within a predefined tolerance range.

In addition, different colors can be associated with different portions of the motion pattern of the predetermined gesture features 329. Thus, user 410 is requested to select corresponding colors to reproduce the motion pattern of the predetermined gesture features 329.

Figure 6:
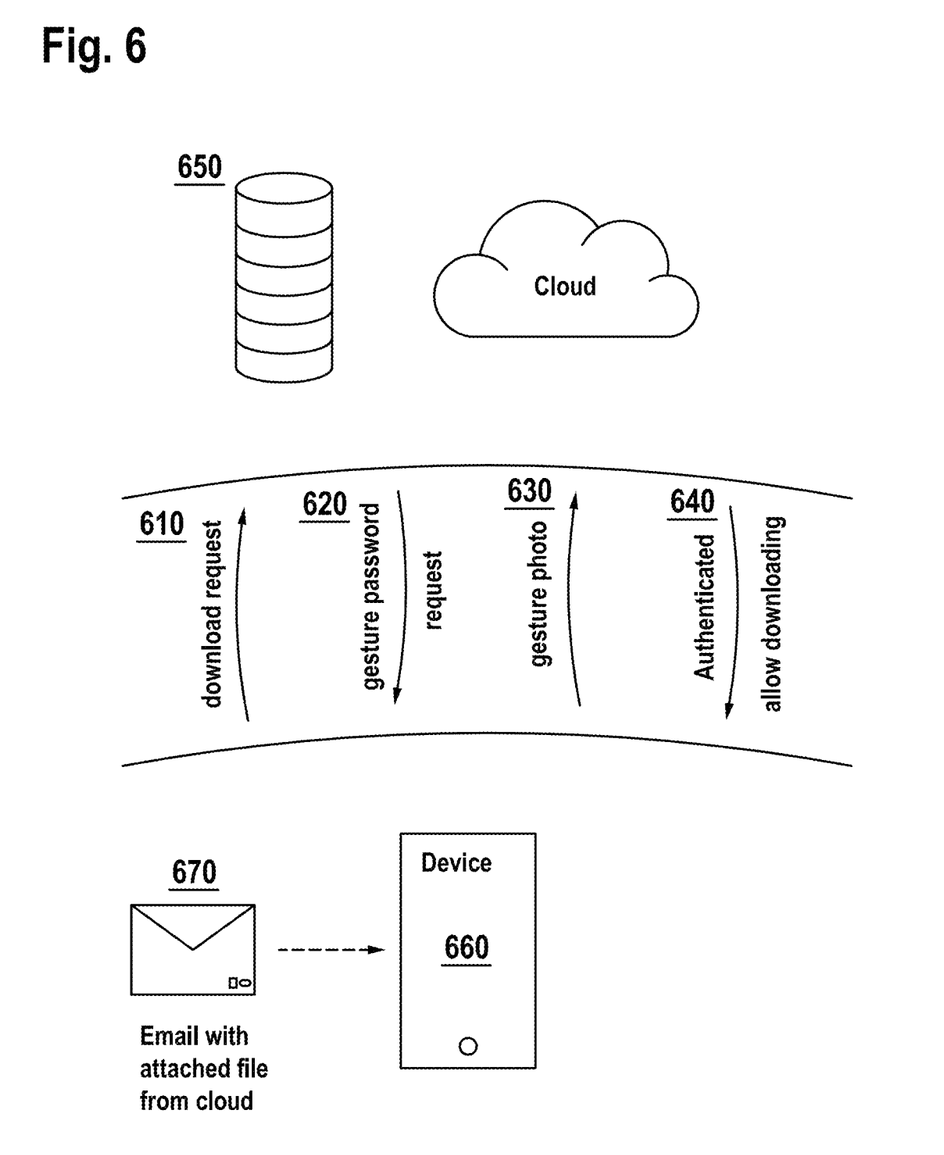
FIG. 6 schematically illustrates a further application of the above method for authenticating a user.

FIG. 6 schematically illustrates a further application of method 100 for authenticating a user. In the application of FIG. 6, a user wants to access data. For example, the user wants to download an email 670 from a cloud server 650 to a device (e.g. a mobile or a computer) 660. Therefore, the user asks a cloud server 650 for access to the email 670 in a first step 610. In a next step 620, the cloud server 650 requests the user for authentication. In a subsequent step 630, the user records and uploads image data to the cloud for the authentication. In accordance with method 100, the cloud server 650 can determine the user's degree of access based on the uploaded image data of the user and predetermined gesture features and facial features. Depending on the degree of access, the user whether is allowed or not allowed to download the email 670 in a next step 640.

In this way, the owner 310 of data can share data (e.g. images, documents, etc.) with one or more multiple users. Moreover, the owner 310 can grant different users different degrees of access to the data.

Method 100 can also be used to differentiate between human and non-human users. Method 100, for example, comprises determining whether the user is human based on at least one of a comparison between the first facial feature with the predetermined second facial feature and a comparison of the first gesture feature with the predetermined second gesture feature. For example, method 100 can be used in a completely automated public Turing test to tell computers and humans apart (CAPTCHA).

When visiting websites, users are occasionally required to participate in a CAPTCHA to prove that they human and not e.g. brute force algorithms.

In applications of method 100 in CAPTCHAs, the predetermined gesture features 329, for example, can be displayed to the user on a screen to enable human users to imitate the predetermined gesture features 329 when recording 110 the image data. The user, for example, is asked to smile.

The predetermined facial features 321, for example, comprise "typical" or "generic" human facial features (e.g. eyes, nose, mouth, etc.) such that facial features of any human user correspond to the predetermined facial features 321.

The user can record image data of his body and face while imitating the predetermined gestures and provide the CAPTCHA with the image data. The CAPTCHA provides for deriving gesture features and facial features from the image data and checking whether the user is human or not through a comparison of the gesture features and the user's facial features with the predetermined gesture features and human facial features. If the user is human and imitates the predetermined gesture features correctly, both the gesture features and the user's facial features correspond to the predetermined gesture features and human facial features. As a result, the user is authenticated and granted to access, for example, a website using the CAPTCHA for protection from malicious brute force algorithms.

Such CAPTCHAs can be generated automatically. Doing such CAPTCHAs in the proposed way using method 100 might even be fun for humans while robots are blocked.

In other applications of method 100 for protection of electronic devices, an owner of the device can control the degree of access of a user to the device. The owner, for example, tells the user a first portion of the predetermined gesture features to grant access to a first portion of data. But the owner can also tell the user another portion of predetermined features to grant access to a second portion of data.

Further embodiments pertain to:

(1) A method for authenticating a user, comprising:
recording image data of the user;
deriving at least one first facial feature of the user's face and at least one first gesture feature of one or more gestures of the user from the image data; and
determining a degree of access of the user to data depending on whether the first gesture feature corresponds to at least one predetermined second gesture feature and whether the first facial feature corresponds to at least one predetermined second facial feature.

(2) Method of (1),
wherein, if the first gesture feature corresponds to the second gesture feature, the degree of access enables the user to retrieve the data.

(3) Method of (1) or (2), wherein, if the first gesture feature corresponds to the second gesture feature and the first facial feature correspond to the predetermined second facial feature, the degree of access enables the user to retrieve and modify the data.

(4) Method of any one of (1) to (3), wherein the image data comprises a single image of the user.

(5) Method of any one of (1) to (4), wherein the image data comprises a sequence of images of the user.

(6) Method of any one of (1) to (5), wherein the gestures comprise at least one of a body gesture, a hand gesture and a facial gesture.

(7) Method of any one of (1) to (6), wherein the image data comprise three-dimensional image data of the user.

(8) Method of any one of (1) to (7), wherein the method further comprises recording training image data of at least one test user, determining at least one label indicative of at least one third gesture feature of one or more gestures of the recorded test user and using machine learning based on the training image data and the labels for training an artificial neural network to detect the first gesture feature from the image data.

(9) Method of any one of (1) to (8), comprising:
recording reference image data of a reference user; and deriving at least one of the second gesture feature and the second facial feature from the reference image data.

(10) Method of (9), comprising detecting the second gesture feature using the reference image data.

(11) Method of (9) or (10), wherein the reference image data comprises a single picture of the reference user.

(12) Method of any one of (9) to (11), wherein the reference image data comprises a sequence of pictures of the reference user.

(13) Method of any one of (1) to (12), comprising determining whether the user is human based on at least one of a comparison between the first facial feature with the predetermined second facial feature and a comparison of the first gesture feature with the predetermined second gesture feature.

(14) A computer program comprising instructions, which, when the computer program is executed by a processor, cause the processor to carry out the method of any one of (1) to (13).

(15) A system for authenticating a user, the system comprising:
a camera configured to record image data of the user; and
a data processing circuitry configured to:
derive at least one first facial feature of the user's face and at least one first gesture feature of one or more gestures of the user using the image data; and
determine a degree of access of the user to data depending on whether the first gesture feature corresponds to at least one predetermined second gesture feature and whether the first facial feature correspond to at least one predetermined second facial feature.

(16) A method for setting up an authentication of a first user based on at least one sensed first facial feature of the first user's face and at least one sensed first gesture feature of one or more gestures of the first user, the method comprising:
recording reference image data of a second user;
deriving at least one of a second gesture feature of one or more gestures of the second user and a second facial feature of the second user's face using the reference image data for determining a degree of access of the first user to data depending on whether the first gesture feature corresponds to the second gesture feature and whether the first facial feature correspond to the predetermined second facial feature.

(17) A computer program comprising instructions, which, when the computer program is executed by a processor, cause the processor to carry out the method of (16).

(18) A system for setting up an authentication of a first user based on at least one sensed first facial feature of a face of the first user and at least one sensed first gesture feature of one or more gestures of the first user, the system comprising:
a camera configured to record reference image data of a second user; and
a data processing circuitry configured to derive at least one of a second gesture feature of one or more gestures of the second user and a second facial feature of a face of the second user using the reference image data for determining a degree of access of the first user to data depending on whether the first gesture feature corresponds to the second gesture feature and whether the first facial feature correspond to the predetermined second facial feature.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A method for authenticating a user, comprising:
recording, with a camera, image data of the user, the image data recorded with the camera being three-dimensional image data of the user;
deriving at least one first facial feature of the user's face and at least one first gesture feature of one or more gestures of the user from the image data;
determining a degree of access of the user to data depending on whether the first gesture feature corresponds to at least one predetermined second gesture feature and whether the first facial feature corresponds to at least one predetermined second facial feature; and
permitting the user access the data depending on the degree of access determined, wherein
the degree of access permits the user to retrieve the data if the first gesture feature corresponds to the at least one predetermined second gesture feature,
the degree of access permits the user to retrieve and modify the data if the first gesture feature corresponds to the at least one predetermined gesture feature and the first facial feature corresponds to the at least one predetermined second facial feature, and
the degree of access denies access to the user if the first facial feature corresponds to the at least one predetermined second facial feature but the first gesture feature does not correspond to the at least one predetermined second gesture feature,
wherein the method further comprises recording training image data of at least one test user, determining at least one label indicative of at least one third gesture feature of one or more gestures of the recorded test user, and using machine learning based on the training image data and the labels for training an artificial neural network to detect the first gesture feature from the image data.

2. The method of claim 1, wherein the image data comprises a single image of the user.

3. The method of claim 1, wherein the image data comprises a sequence of images of the user.

4. The method of claim 1, wherein the gestures comprise at least one of a body gesture, a hand gesture and a facial gesture.

5. The method of claim 1, comprising:
recording reference image data of a reference user; and
deriving at least one of the second gesture feature and the second facial feature from the reference image data.

6. The method of claim 5, comprising detecting the second gesture feature using the reference image data.

7. The method of claim 5, wherein the reference image data comprises a single picture of the reference user.

8. The method of claim 5, wherein the reference image data comprises a sequence of pictures of the reference user.

9. The method of claim 1, comprising determining whether the user is human based on at least one of a comparison between the first facial feature with the predetermined second facial feature and a comparison of the first gesture feature with the predetermined second gesture feature.

10. A non-transitory computer-readable medium encoded with computer readable instructions, which, when executed by a processor, cause the processor to carry out the method of claim 1.

11. A system for authenticating a user, the system comprising:
a camera configured to record image data of the user, the image data recorded by the camera being three-dimensional image data of the user; and
a data processing circuitry configured to:
derive at least one first facial feature of the user's face and at least one first gesture feature of one or more gestures of the user using the image data;
determine a degree of access of the user to data depending on whether the first gesture feature corresponds to at least one predetermined second gesture feature and whether the first facial feature correspond to at least one predetermined second facial feature; and
permit the user to access the data depending on the degree of access determined, wherein
the degree of access permits the user to retrieve the data if the first gesture feature corresponds to the at least one predetermined second gesture feature,
the degree of access permits the user to retrieve and modify the data if the first gesture feature corresponds to the at least one predetermined gesture feature and the first facial feature corresponds to the at least one predetermined second facial feature, and
the degree of access denies access to the user if the first facial feature corresponds to the at least one predetermined second facial feature but the first gesture feature does not correspond to the at least one predetermined second gesture feature,
wherein the data processing circuitry is further configured to record training image data of at least one test user, determine at least one label indicative of at least one third gesture feature of one or more gestures of the recorded test user, and use machine learning based on the training image data and the labels for training an artificial neural network to detect the first gesture feature from the image data.

12. The system according to claim 11, wherein the camera is a time-of-flight (TOF) camera configured to record the three-dimensional image data of the second user.

13. The system according to claim 12, further comprising a second camera configured to record two-dimensional image data of the second user, the reference image data further including the two-dimensional image data of the second user.

14. The system according to claim 11, wherein the camera includes a lidar system to record at least part of the reference image data.

15. A method for setting up an authentication of a first user based on at least one sensed first facial feature of the first user's face and at least one sensed first gesture feature of one or more gestures of the first user, the method comprising:
recording, with a camera, reference image data of a second user, the reference image data recorded by the camera being three-dimensional image data of the second user;
deriving at least one of a second gesture feature of one or more gestures of the second user and a second facial feature of the second user's face using the reference image data for determining a degree of access of the first user to data depending on whether the first gesture feature corresponds to the second gesture feature and whether the first facial feature correspond to the second facial feature,
wherein the user is permitted to access the data depending on the degree of access determined, and wherein
the degree of access permits the user to retrieve the data if the first gesture feature corresponds to the at least one predetermined second gesture feature,
the degree of access permits the user to retrieve and modify the data if the first gesture feature corresponds to the at least one predetermined gesture feature and the first facial feature corresponds to the at least one predetermined second facial feature, and
the degree of access denies access to the user if the first facial feature corresponds to the at least one predetermined second facial feature but the first gesture feature does not correspond to the at least one predetermined second gesture feature,
wherein the method further comprises recording training image data of at least one test user, determining at least one label indicative of at least one third gesture feature of one or more gestures of the recorded test user, and using machine learning based on the training image data and the labels for training an artificial neural network to detect the first gesture feature from the image data.

16. A non-transitory computer-readable medium encoded with computer-readable instructions, which, when executed by a processor, cause the processor to carry out the method of claim 15.

17. A system for setting up an authentication of a first user based on at least one sensed first facial feature of a face of the first user and at least one sensed first gesture feature of one or more gestures of the first user, the system comprising:
a camera configured to record reference image data of a second user, the reference image data recorded being three-dimensional image data of the second user; and
a data processing circuitry configured to derive at least one of a second gesture feature of one or more gestures of the second user and a second facial feature of a face of the second user using the reference image data for determining a degree of access of the first user to data depending on whether the first gesture feature corresponds to the second gesture feature and whether the first facial feature correspond to the second facial feature,
wherein the user is permitted to access the data depending on the degree of access determined, and wherein
the degree of access permits the user to at least retrieve the data if the first gesture feature corresponds to the at least one predetermined second gesture feature,
the degree of access permits the user to retrieve and modify the data if the first gesture feature corresponds to the at least one predetermined gesture feature and the first facial feature corresponds to the at least one predetermined second facial feature, and
the degree of access denies access to the user if the first facial feature corresponds to the at least one predetermined second facial feature but the first gesture feature does not correspond to the at least one predetermined second gesture feature,
wherein the data processing circuitry is further configured to record training image data of at least one test user, determine at least one label indicative of at least one third gesture feature of one or more gestures of the recorded test user, and use machine learning based on the training image data and the labels for training an artificial neural network to detect the first gesture feature from the image data.

* * * * *